Patented Aug. 23, 1949

2,479,782

UNITED STATES PATENT OFFICE 2,479,782

CONDENSATION PRODUCTS OF AMIDES WITH BISULFITES AND ALDEHYDES AND PROCESS OF MAKING SAME

Richard Sallmann, Gelterkinden, and Charles Graenacher, Riehen, Switzerland, assignors to Ciba Limited, Basel, Switzerland, a Swiss firm No Drawing. Application July 3, 1946, Serial No. 681,409. In Switzerland July 16, 1945

13 Claims. (Cl. 260—404)

According to this invention new derivatives of amides are made by causing an amide containing at least one hydrogen atom bound to at least one amide-nitrogen atom to react at a raised temperature with a bisulfite and an aldehyde which contains at least one sulfonic acid group or a bond capable of additive combination with a bisulfite to form a sulfonic acid group, especially a C:C-double bond, and, if desired, conducting the reaction with the addition of a solvent or a small quantity of a secondary amine.

The amides used as starting materials may be derived either from carboxylic acids or sulfonic acids, and from ammonia or basic mono-substitution products of ammonia. Thus, there may be mentioned, for example, carboxylic acid amides, urethanes, ureas, and hydrazides.

There may be used as starting materials for example, amides derived from aliphatic, aromatic, aliphatic-aromatic, cyclo-aliphatic or heterocyclic carboxylic acids. Among such acids there may be mentioned: Formic acid, acetic acid, propionic acid, acrylic acid, butyric acid, caprylic acid, lauric acid, coconut oil fatty acid, palmitic acid, stearic acid, oleic acid, linoleic acid, hardened train oil fatty acid, maleic acid, adipic acid, and also benzoic acid, naphthoic acid, para-stearyl-aminobenzoic acid, hexahydrobenzoic acid, tetrahydronaphthyl-acetic acid; resin acids or naphthenic acids, such as abietic acid; and furthermore chloracetic acid, chloromethylbenzoic acid, chloropropionic acid, or glycollic acid. There are also suitable as starting materials N-substitution products of the above-named amides which still contain at least one hydrogen atom bound to the nitrogen atom, such as N-methyl-, N-ethyl-, N-hydroxyethyl-, N-dihydroxypropyl- or N-phenyl-lauric acid amide. There also come into consideration secondary amides, such as dibenzamide, furthermore N:N'-diacylated methylene diamines, such as N:N'-di-stearyl methylenediamine. The most suitable starting materials are, however, primary carboxylic acid amides. As starting materials there may also be mentioned cyclic amides such as phthalimide and diketo-piperazine. As amides of the urea group there come into consideration, for example, urea, monoethyl-, monophenyl-, monododecyl-, monoocta-decyl- or N:N'-didodecyl-urea; and as amides of the urethane group, for example octadecyl-urethane, and also diurethanes, such as methylene dioctadecyl-urethane. Among the amides to be used as starting materials there may also be mentioned thiourea, dicyandiamide and melamine. As amides of the hydrazine group there may be mentioned, for example, the hydrazides corresponding to the foregoing amides, such as lauric acid hydrazide.

As aldehydes containing at least one sulfonic acid group there may be used, for example, acetaldehyde disulfonic acid, propionaldehyde sulfonic acids, butyraldehyde sulfonic acids, and also benzaldehyde sulfonic acids, such as benzaldehyde-ortho-sulfonic acid, or salts of the foregoing acids. Among the unsaturated aldehydes which combine additively with bisulfite with the formation of a sulfonic acid group the following may be mentioned which all contain a reactive double bond: Acrolein, crotonaldehyde, citronellal and also cinnamic aldehyde.

As bisulfites for the purposes of the present invention there come primarily into consideration the alkali and alkaline earth salts of sulfurous acid, for example, potassium or sodium bisulfite. Instead of bisulfites there may be used pyrosulfites.

The reaction may be carried out by heating the reaction components, while stirring, advantageously at a temperature exceeding 100° C., for example, at 105–200° C. It is of advantage to assist the transfer of heat by the addition of finely subdivided solid substances, such as sodium sulfate. In many cases it is of advantage to conduct the reaction in the presence of a solvent, such as a polyglycol, for example, diethyleneglycol, or N-formyl-morpholine. The amide may alternatively be dissolved in an aqueous solution containing the bisulfite and the aldehyde or the aldehyde-bisulfite compound, or, in the case of an amide of high molecular weight, finely dispersed in such aqueous solution, followed by distillation of the water and completion of the reaction by heating, for example, to 120–160° C. It may also be advisable to assist the splitting off of water which occurs during the condensation by working under reduced pressure or by azeotropic distillation with the aid of an auxiliary solvent. In general it is of advantage to conduct the reaction in the presence of a small quantity of a secondary amine or a salt thereof, for example, with the addition of piperidine, di-isoamylamine or di-ethanolamine. In this manner the speed of the reaction is increased.

When a sulfonated aldehyde is used as starting material for the reaction at least one equivalent of a bisulfite is used. When unsaturated aldehydes are used at least 2 molecular proportions of bisulfite are used per molecular proportion of aldehyde, since during the reaction the bisulfite additively combines at the unsaturated bond. Instead of a mixture of 1 molecular proportion of aldehyde and 1 molecular proportion of bisulfite there may be used 1 molecular proportion of the aldehyde-bisulfite compound.

The products of the invention, owing to the presence of at least two sulfonic acid groups therein, are soluble in water and find application as textile assistants the products of low molecular weight, for example as wetting agents in concentrated solutions of electrolytes, for instance, in mercerizing liquors. More valuable, however, are the products of the invention which contain an aliphatic or cycloaliphatic residue of at least 8, preferably at least 12 carbon atoms, since on account of their pronounced capillary activity in aqueous solution they may be used as wetting, dispersing, washing or softening agents or dyeing assistants. They are also suitable as agents for preventing the agglomeration of cellulose fibers in the manufacture of staple fibers of regenerated cellulose. They possess good resistance to substances causing the hardness of water, and as compared with products of comparable constitution which contain only one sulfonic acid group, are distinguished by a superior washing action in hard water. They may be used alone or together with other additions customarily used with textile assistants.

The products of the invention may be designated as amide derivatives of the general formula

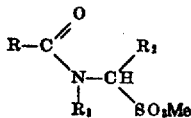

wherein

is the acyl radical of a carboxylic acid, $R_1$ is a member selected from the group consisting of hydrogen and hydrocarbon radicals, Me is a cation and $R_2$—CH< is an aldehyde radical which contains at least two connected carbon atoms and at least one neutralized sulfonic acid group and in which the two free valencies replace the oxygen atom of an aldehyde of the formula

which amide derivative is a liquid to solid substance which, in the form of an alkali salt, is soluble in water. Easily obtainable are, for instance, the products of the general formula

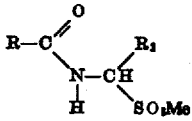

wherein

Me and $R_2$—CH< have the meaning mentioned above. Products of the invention which are obtainable when starting from crotonaldehyde may correspond to the general formula

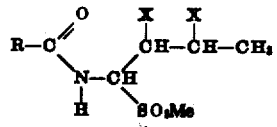

wherein

and Me have the aforesaid significance, one $x$ is —$SO_3$Me and the other $x$ is hydrogen. Derivatives of the benzaldehyde-ortho-sulfonic acid correspond to the formula

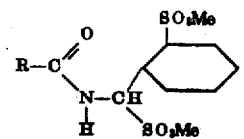

wherein

and Me have the meaning indicated above.

The following examples illustrate the invention, the parts being by weight unless otherwise stated and the relationship of parts by weight to parts by volume being the same as that of the kilogram to the liter:

*Example 1*

5.6 parts of commercial stearic acid amide are heated while stirring at 110–120° C. with 15 parts of formyl-morpholine until a clear solution is obtained. After cooling to 90–95° C. there are added in portions first 1.7 parts of crotonaldehyde and then 5 parts of finely pulverized and well dried sodium bisulfite. The temperature of the heating bath is raised to 130–140° C. and the reaction ceases after 4 hours. At the end of this period a test portion of the reaction mixture is clearly soluble in water. In order to remove the formyl-morpholine 50 parts by volume of absolute alcohol are added. After boiling for a short time and cooling, the whole is filtered, the filter residue constituting the new product. The latter is freed from a small quantity of sodium bisulfite by recrystallization from alcohol of about 80 per cent. strength. The new product of the formula

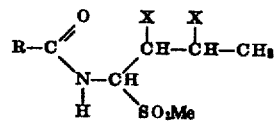

wherein

is the acyl radical of commercial stearic acid, one $x$ is —$SO_3$Na, the other $x$ is hydrogen, and Me is sodium, is a white powder which dissolves clearly in water. Its aqueous solutions foam strongly, are stable towards acid, and possess remarkable washing properties even in hard water.

Instead of dissolving the formyl-morpholine out of the reaction mass by means of alcohol as described above, it may be removed by distillation under reduced pressure.

Instead of stearic acid amide stearic acid N-methyl amide may be used. Furthermore acrolein may serve as starting material instead of crotonaldehyde.

Example 2

5.6 parts of oleic acid amide are dissolved in 15 parts of diethyleneglycol at 110–120° C. After cooling to 80–90° C. there are introduced first, while stirring, 1.8 parts of crotonaldehyde and then 5 parts of pulverized and well dried sodium bisulfite. The temperature is raised to 130–140° C., and kept thereat for 2 hours. By the addition of 0.1 part of piperidine the reaction can be accelerated somewhat. By heating with acetone, cooling and filtering, the product can be freed from diethyleneglycol. There are obtained 8.5 parts of a yellowish, soft, hygroscopic mass of the formula

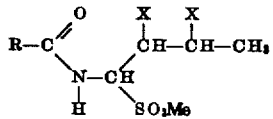

wherein

is the acyl radical of commercial oleic acid, one $x$ is —$SO_3Na$, the other $x$ is hydrogen, and Me is sodium. A test portion is easily soluble in water. The solution is clear, foams strongly, and has very good washing properties even in hard water.

Example 3

2.8 parts of oleic acid amide, 0.9 part of crotonaldehyde and 2.5 parts of finely pulverized and well dried sodium bisulfite are heated in an oil bath at 150–160° C. while slowly stirring. When the mass has begun to melt, 0.1 part of piperidine is added. Rather strong foaming occurs, and the mass, which is at first yellowish and thinly liquid, gradually thickens. After about 30 minutes foaming completely ceases, and the product becomes so thick that it can no longer be stirred. A test portion is soluble in water to give a slight turbidity. After heating for a further 30 minutes without stirring, 50 parts of absolute alcohol are added, and then the whole is boiled in a reflux apparatus until the whole is well dispersed. After cooling the reaction product is filtered. It possesses the same properties as the product of Example 2.

Example 4

9.5 parts of commercial stearic acid amide are dissolved in 30 parts of formyl-morpholine at 110–120° C. After cooling to 80–90° C. there are added first 8 parts of sodium benzaldehyde-ortho-sulfonate and then 8 parts of pulverized sodium bisulfite. The temperature is raised to 130–140° C. After 4 hours a test portion is clearly soluble in hot water. The reaction mass is boiled with 40 parts by volume of acetone until the whole is well dispersed, and then the mixture is cooled and filtered. The residue is freed from acetone by heating under reduced pressure. There are obtained 11 parts of a white powder of the formula

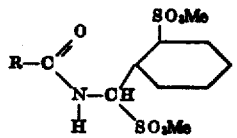

wherein

is the acyl radical of commercial stearic acid, and Me is sodium, which is easily soluble in hot water and sparingly soluble in cold water.

Instead of benzaldehyde-ortho-sulfonic acid there may be used butyraldehyde sulfonic acid. Furthermore, another primary fatty acid amide, for instance, oleic acid amide may serve as starting material instead of the above mentioned stearic acid amide.

Example 5

5.6 parts of commercial stearic acid amide are dissolved in 15 parts of diethyleneglycol at 110–120° C. At 80–90° C. there are introduced, while stirring, 3.2 parts of cinnamic aldehyde and thereafter 5 parts of pulverized sodium bisulfite. The whole is then stirred for 4 hours at a bath temperature of 130–140° C. By the addition of 0.1 part of piperidine the reaction can be accelerated. After working up in a manner analogous to that described in the preceding examples there is obtained a white powder which is clearly soluble in hot water.

Example 6

8 parts of coconut oil fatty acid amide are dissolved in 15 parts of diethyleneglycol, and 3.6 parts of crotonaldehyde and thereafter 10 parts of pulverized sodium bisulfite are introduced while stirring at 80–90° C. After heating for 4 hours at 130–140° C. the reaction ceases. After working up in the manner described in the preceding examples a yellowish colored powder is obtained which dissolves clearly in water. The solutions foam strongly and possess good wetting and washing properties.

Example 7

1.8 parts of crotonaldehyde, 5 parts of pulverized sodium bisulfite and 0.1 part of piperidine are added to a solution of 6.2 parts of octadecyl-urethane in 15 parts of diethyleneglycol at 80–90° C. while stirring. After heating for 2 hours at 130–140° C. a test portion is clearly soluble in cold water. The diethyleneglycol is extracted with acetone, and the residue is freed from acetone under reduced pressure. A yellowish colored soft mass of the formula

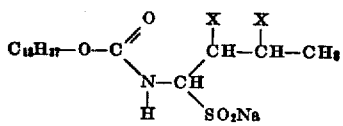

wherein one $x$ is —$SO_3Na$ and the other $x$ is hydrogen, is obtained which is clearly soluble in water.

Example 8

For the purpose of washing crude wool there is prepared a bath containing per liter of water of 20° German hardness, 0.5 gram of the product obtainable as described in Example 1 and 1.5 grams of sodium sulfate. The wool is worked in the bath at a liquor ratio of 1:20 for ½ hour at 45° C., and rinsed. After this treatment the material is very well cleansed.

What we claim is:

1. Process for the manufacture of condensation products, which comprises heating to a temperature of 105–200° C. one molecular proportion of a carboxylic acid amide containing at least one hydrogen atom bound to an amide nitrogen atom with at least one molecular proportion of an alkaline bisulfite and one molecular proportion of a member selected from the group consisting of aliphatic aldehydes containing three to four carbon atoms and at least one neutralized sulfonic acid group, and unsaturated aliphatic aldehydes which contain three to four carbon atoms and a C:C-double bond.

2. Process for the manufacture of condensation products, which comprises heating to a temperature of 105–200° C. one molecular proportion of a primary aliphatic carboxylic acid amide with at least one molecular proportion of an alkaline bisulfite and one molecular proportion of a member selected from the group consisting of aliphatic aldehydes containing three to four carbon atoms and at least one neutralized sulfonic acid group, and unsaturated aliphatic aldehydes which contain three to four carbon atoms and a C:C-double bond.

3. Process for the manufacture of condensation products, which comprises heating to a temperature of 105–200° C. one molecular proportion of a primary aliphatic carboxylic acid amide containing at least 12 carbon atoms with two molecular proportions of an alkali metal bisulfite and one molecular proportion of an unsaturated aliphatic aldehyde containing three to four carbon atoms and a C:C-double bond.

4. Process for the manufacture of condensation products, which comprises heating to a temperature of 105–200° C. one molecular proportion of a primary aliphatic carboxylic acid amide containing at least 12 carbon atoms with two molecular proportions of an alkali metal bisulfite and one molecular proportion of an unsaturated aliphatic aldehyde containing three to four carbon atoms.

5. Process for the manufacture of condensation products, which comprises heating to a temperature of 105–200° C. one molecular proportion of a primary aliphatic carboxylic acid amide containing at least 12 carbon atoms with two molecular proportions of an alkali metal bisulfite and one molecular proportion of crotonaldehyde.

6. Process for the manufacture of condensation products, which comprises heating to a temperature of 105–200° C. one molecular proportion of commercial stearic acid amide with two molecular proportions of an alkali metal bisulfite and one molecular proportion of crotonaldehyde.

7. Process for the manufacture of condensation products, which comprises heating to a temperature of 105–200° C. one molecular proportion of commercial oleic acid amide with two molecular proportions of an alkali metal bisulfite and one molecular proportion of crotonaldehyde.

8. An amide derivative of the general formula

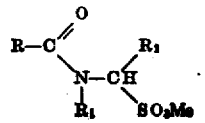

wherein

is the acyl radical of a carboxylic acid, $R_1$ is a member selected from the group consisting of hydrogen and hydrocarbon radicals, Me is a cation and $R_2$ is an alkyl radical which contains two to three carbon atoms and also contains one neutralized sulfonic acid group.

9. An amide derivative of the general formula

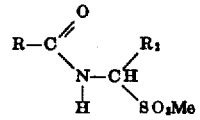

wherein

is the acyl radical of an aliphatic carboxylic acid, Me is a cation and $R_2$ is an alkyl radical which contains two to three carbon atoms and also contains one neutralized sulfonic acid group.

10. An amide derivative of the general formula

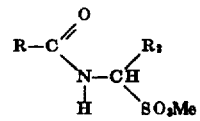

wherein

is the acyl radical of an aliphatic carboxylic acid containing at least 12 carbon atoms, Me is an alkali metal and $R_2$ is an alkyl radical which contains two to three carbon atoms and one neutralized sulfonic acid group.

11. An amide derivative of the general formula

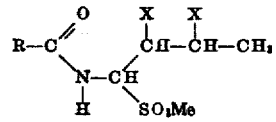

wherein

is the acyl radical of an aliphatic carboxylic acid containing at least 12 carbon atoms, Me is an alkali metal, and one $x$ is —$SO_3Me$, Me representing an alkali metal, and the other $x$ is hydrogen.

12. An amide derivative of the formula

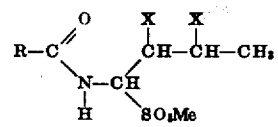

wherein

is the acyl radical of commercial stearic acid, Me is an alkali metal, and one $x$ is —$SO_3Me$, Me representing an alkali metal, and the other $x$ is hydrogen.

13. An amide derivative of the formula

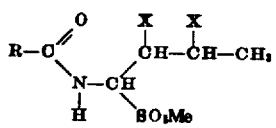

wherein

is the acyl radical of commercial oleic acid, Me is an alkali metal, and one $x$ is —SO$_3$Me, Me representing an alkali metal, and the other $x$ is hydrogen.

RICHARD SALLMANN.
CHARLES GRAENACHER.

REFERENCES CITED

The following references are of record in the file of this patent:

UNITED STATES PATENTS

| Number | Name | Date |
|---|---|---|
| 2,185,817 | Mauersberger | Jan. 2, 1940 |
| 2,313,695 | Yamashita et al. | Mar. 9, 1943 |
| 2,366,452 | Mack | Jan. 2, 1945 |
| 2,367,010 | Davis et al. | Jan. 9, 1945 |